(12) United States Patent
Shimonek et al.

(10) Patent No.: US 10,767,437 B2
(45) Date of Patent: Sep. 8, 2020

(54) BLOWOUT PREVENTER BONNET RETENTION METHODS AND SYSTEMS

(71) Applicant: Cameron International Corporation, Houston, TX (US)

(72) Inventors: Steven Shimonek, Houston, TX (US); Charles Gibbs, Stafford, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 15/886,457

(22) Filed: Feb. 1, 2018

(65) Prior Publication Data
US 2019/0234170 A1  Aug. 1, 2019

(51) Int. Cl.
*E21B 33/06*   (2006.01)
*F16L 23/024*  (2006.01)

(52) U.S. Cl.
CPC .......... *E21B 33/062* (2013.01); *F16L 23/024* (2013.01)

(58) Field of Classification Search
None
See application file for complete search history.

(56) References Cited

U.S. PATENT DOCUMENTS

| | | | | |
|---|---|---|---|---|
| 3,208,357 A | * | 9/1965 | Allen | E21B 33/062 188/67 |
| 4,076,208 A | * | 2/1978 | Olson | E21B 33/062 251/1.3 |
| 4,437,643 A | * | 3/1984 | Brakhage, Jr. | E21B 33/062 251/1.3 |
| 4,504,037 A | * | 3/1985 | Beam | E21B 33/062 137/315.02 |
| 4,582,293 A | * | 4/1986 | Jones | E21B 33/062 251/1.1 |
| 4,969,627 A | * | 11/1990 | Williams, III | E21B 33/062 251/1.3 |
| 5,178,215 A | | 1/1993 | Yenulis et al. | |
| 6,006,647 A | * | 12/1999 | Van Winkle | E21B 33/062 91/41 |
| 6,860,525 B2 | | 3/2005 | Parks | |
| 8,382,415 B1 | * | 2/2013 | Goldbaum | F16B 39/122 411/366.1 |

(Continued)

OTHER PUBLICATIONS

Lee Breech Lock Quick Change Bushing; Midway USA, https://www.midwayusa.com/product/1012849384, accessed Jun. 2017, 2 pages.

*Primary Examiner* — Daphne M Barry
(74) *Attorney, Agent, or Firm* — Helene Raybaud

(57) ABSTRACT

Methods and systems for retaining bonnets on blowout preventers. In one embodiment, a blowout preventer includes a hollow body, a ram disposed in a ram cavity of the hollow body, and a bonnet coupled to the hollow body. The bonnet is fastened to the hollow body with threaded fasteners, which include a threaded shaft and a threaded nut. The shaft and the nut include mating interrupted threads with threaded portions and longitudinal unthreaded portions that can be rotationally aligned so that threaded portions of each of the shaft and the nut are aligned with unthreaded portions of the other of the shaft and the nut to allow the threaded shaft to be received within the threaded nut and the threaded nut to then be rotated with respect to the threaded shaft to cause the threaded portions of the threaded nut to engage the threaded portions of the threaded shaft.

20 Claims, 9 Drawing Sheets

(56) References Cited

U.S. PATENT DOCUMENTS

| | | |
|---|---|---|
| 8,857,784 B2 | 10/2014 | Shimonek et al. |
| 8,944,403 B2 | 2/2015 | Jurena et al. |
| 9,068,427 B2 | 6/2015 | Jurena et al. |
| 9,803,447 B2 | 10/2017 | Jurena et al. |
| 2004/0057811 A1* | 3/2004 | Kelzer ................ B23B 31/1122 411/389 |
| 2013/0264503 A1* | 10/2013 | Jahnke .................. E21B 33/062 251/1.3 |
| 2014/0021381 A1* | 1/2014 | Jurena .................. E21B 33/062 251/1.3 |
| 2016/0251927 A1* | 9/2016 | Kroesen |

* cited by examiner

BLOWOUT PREVENTER BONNET RETENTION METHODS AND SYSTEMS

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once a desired subterranean resource such as oil or natural gas is discovered, drilling and production systems are often employed to access and extract the resource. These systems may be located onshore or offshore depending on the location of a desired resource.

Further, such systems generally include a wellhead assembly through which the resource is accessed or extracted. These wellhead assemblies may include a wide variety of components, such as various casings, valves, fluid conduits, and the like, that control drilling or production operations. More particularly, wellhead assemblies often include blowout preventers, such as a ram-type preventer that uses one or more pairs of opposing rams to restrict flow of fluid through the blowout preventer or to shear through a drill string or another object within the blowout preventer. Such blowout preventers can include bonnets that facilitate access to rams and other internal components.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Some embodiments of the present disclosure generally relate to the retention of bonnets on blowout preventers. In certain embodiments, mating fasteners with interrupted thread patterns are used to connect bonnets to hollow bodies of blowout preventers. The mating fasteners can include nuts and shafts with interrupted thread patterns having threaded portions and unthreaded portions. The threaded portions of each of the nuts and shafts can be rotationally aligned with the unthreaded portions of the other to allow the nuts to be axially moved onto the shafts, with the threaded portions of each fastener generally received along the unthreaded portions of the mating fastener. The nuts can then be rotated to engage the mating threads and make up the threaded connection. In some embodiments, nuts or other threaded fasteners are retained within a bonnet during opening or closing of the bonnet.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
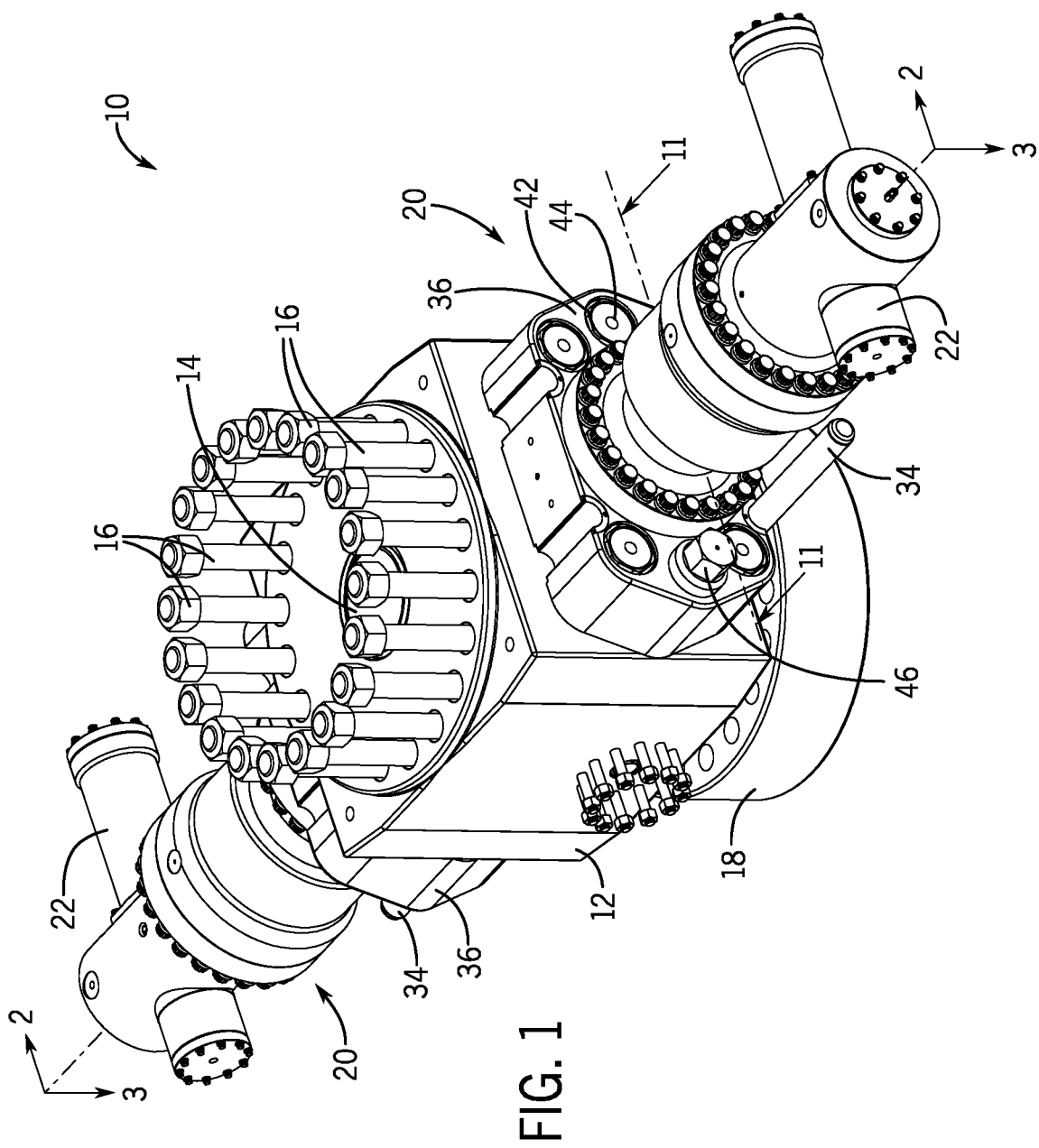
FIG. 1 is a perspective view of a ram-type blowout preventer having bonnet assemblies attached to a hollow main body in accordance with an embodiment of the present disclosure.

Turning now to the drawings, a blowout preventer 10 is illustrated in FIG. 1 by way of example. The depicted blowout preventer 10 includes a hollow main body 12 and a bore 14 that enables passage of fluid or tubular members through the blowout preventer 10. As will be appreciated, the blowout preventer 10 may be coupled to other equipment that facilitates natural resource production. For instance, production equipment or other components may be attached to the top of the blowout preventer 10 via fasteners 16 (provided in the form of studs and nuts in FIG. 1) and the blowout preventer 10 may be attached to a wellhead or spool via flange 18 and additional fasteners.

Bonnet assemblies 20 secured to the main body 12 include various components that facilitate control of rams disposed in the blowout preventer 10, and locking assemblies 22 enable the rams to be locked in a closed position. Particularly, as illustrated in the cross-sections of FIGS. 2 and 3, the blowout preventer 10 includes rams 24 that are disposed in a ram cavity 26 and actuated by operating piston assemblies (of the bonnet assemblies 20) that include pistons 28 and connecting rods 30. In operation, a force (e.g., from hydraulic pressure) may be applied to the operating pistons 28 to drive the rams 24, via the connecting rods 30, into the bore 14 of the blowout preventer 10.

Figure 2:
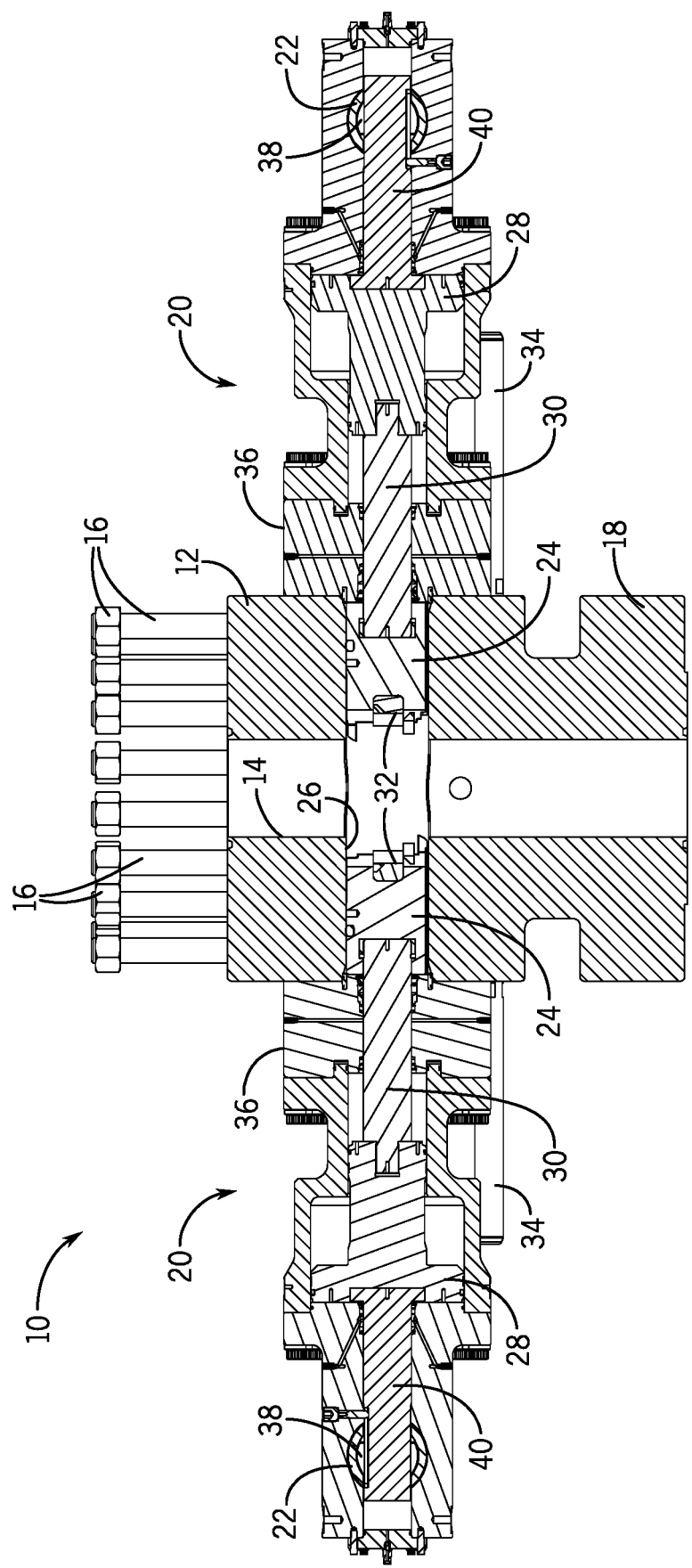
FIG. 2 is a vertical cross-section of the blowout preventer of FIG. 1.
Figure 3:
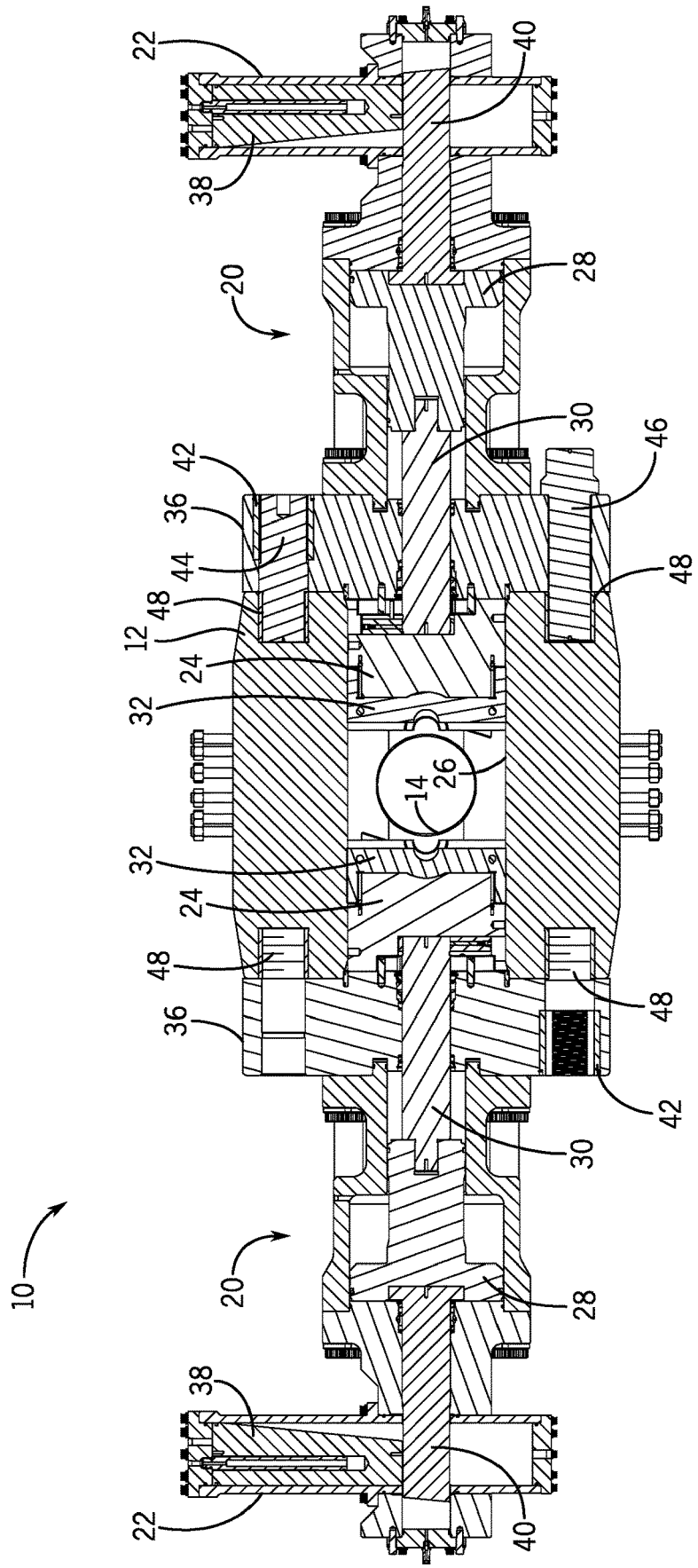
FIG. 3 is a horizontal cross-section of the blowout preventer of FIG. 1.

More specifically, the connecting rods 30, which may also be referred to as actuation rods 30, extend through bonnets 36 of the bonnet assemblies 20 and enable forces on the pistons 28 to be transmitted to the rams 24. In at least some embodiments, the rams 24 include slots for receiving buttons on the ends of the connecting rods 30. While the blowout preventer 10 is depicted in FIGS. 2 and 3 as having elongated, asymmetric ram buttons attached to the connecting rods 30 and received in slots of the rams 24, it will be appreciated that the ram buttons may take other forms. In other embodiments, for example, round ram buttons are used to couple the connecting rods 30 to the rams 24. The blowout preventer 10 can include various seals for containing pressure, including seals between the connecting rods 30 and the bonnets 36 to inhibit leaking while enabling axial movement of the connecting rods through the bonnets. And although the rams 24 are hydraulically actuated in the presently depicted embodiment, it is noted that the rams 24 could be actuated in any other suitable manner (e.g., electrically).

In the presently depicted embodiment, the rams 24 are provided as pipe rams having sealing elements 32 (also known as ram packers) that cooperate with one another when driven together to seal about a tubular member (e.g., a pipe) and inhibit flow through the bore 14 of the blowout preventer 10. But the rams 24 could take other forms, such as variable-bore pipe rams, blind rams, or shear rams, and other blowout preventers 10 could have multiple pairs of rams in various combinations. In some embodiments, when the rams 24 are moved into the closed position to seal the bore 14, wedge locks 38 (FIG. 3) of the locking assemblies 22 may be moved into position behind tail rods 40 of the pistons 28 to hold the rams 24 in their closed positions. This allows the hydraulic pressures acting on the pistons 28 to be reduced (from the closing pressures) while still maintaining the rams 24 in the closed positions. Other suitable locking mechanisms, such as locking sleeves or screws, may also or instead be used to hold the rams 24 in their closed positions in other embodiments.

Figure 4:
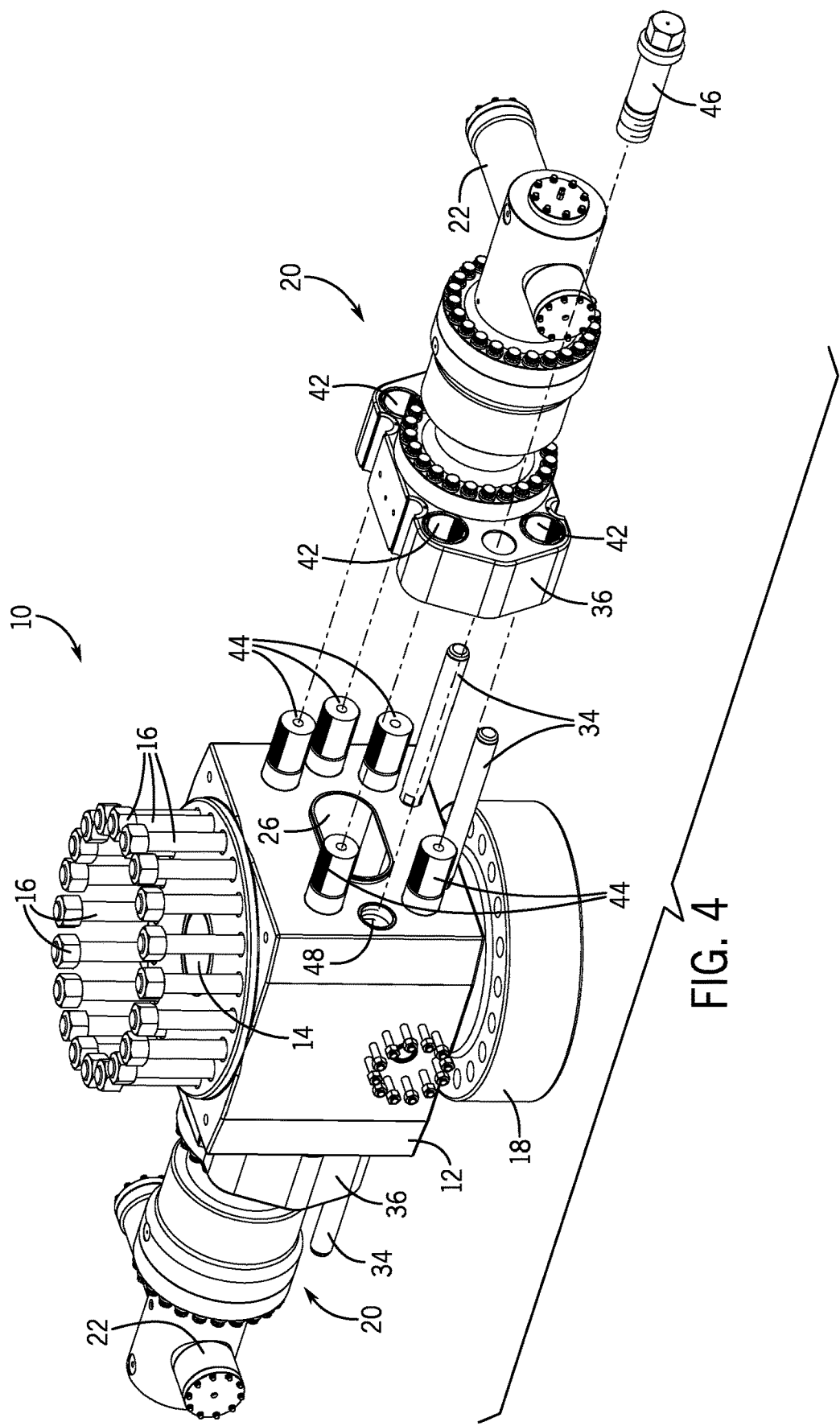
FIG. 4 is a partial exploded view of the blowout preventer of FIG. 1 showing a bonnet disconnected from the hollow main body and threaded shafts extending from the hollow main body for receiving the bonnet in accordance with one embodiment.
Figure 5:
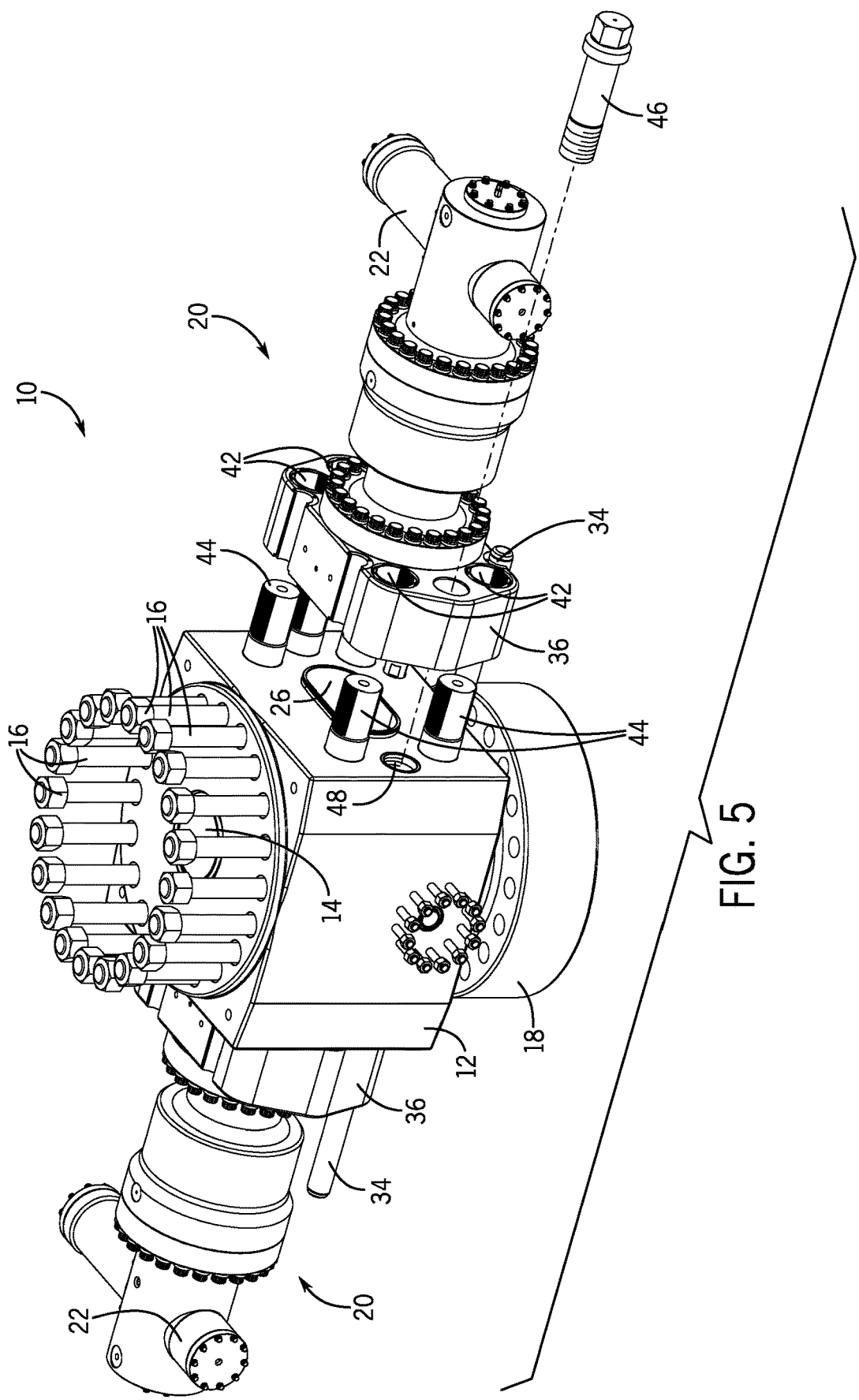
FIG. 5 depicts the blowout preventer of FIG. 4 with the disconnected bonnet positioned on bonnet support rods of the blowout preventer in accordance with one embodiment.

Mounting of the bonnet assemblies 20 to the hollow blowout preventer body 12 may be better understood with reference to FIGS. 4 and 5. In at least some embodiments, including that depicted in FIGS. 4 and 5, the blowout preventer 10 includes bonnet support rods 34 extending from the hollow blowout preventer body 12 to facilitate mounting of the bonnet assemblies 20. For instance, the bonnet 36 of a bonnet assembly 20 can be positioned on the support rods 34 as shown in FIG. 5 so that grooves of the bonnet 36 receive the support rods 34. This aligns the bonnet assembly 20 with the ram cavity 26, and the bonnet 36 can then be moved along the support rods 34 toward the hollow body 12.

Various fasteners may be used to connect the bonnets 36 to the hollow blowout preventer body 12. Some blowout preventers include bonnets fastened to a central body (e.g., a ram-containing main body) with traditional studs and nuts having mating circumferential threads. The bonnets can be positioned on the studs, with the studs extending through mounting holes of the bonnets, and an operator may then lift and fasten a nut to each of the studs to secure the bonnets to the main body. The bonnets could be opened in the reverse manner—an operator may unthread each nut off its mating stud to allow a bonnet to be moved away from the main body, such as to facilitate inspection, changing rams, or other maintenance. Although such an arrangement allows an operator to open or close a bonnet, it relies on an operator lifting, holding, positioning, and rotating the nuts, each of which can weigh more than fifty pounds in some instances.

The blowout preventer 10 depicted in FIGS. 4 and 5 includes mating fasteners 42 and 44 for attaching bonnets 36 to the hollow body 12. But in contrast to the studs and nuts described above as having traditional circumferential threads, the fasteners 42 and 44 have mating interrupted thread patterns that facilitate coupling of the bonnets 36 to the body 12, as described in greater detail below. As shown in FIGS. 3-5, the fasteners 42 are provided in the form of nuts 42 positioned within the bonnets 36, while the fasteners 44 are provided in the form of threaded shafts 44 (more specifically, threaded studs) extending outwardly from sides of the hollow body 12. During assembly, each bonnet 36 can be landed on bonnet support rods 34 (e.g., with the rods 34 received in landing grooves of the bonnet 36) to axially align the nuts 42 in the bonnet 36 with their mating shafts 44. The bonnet 36 can then be moved toward the hollow body 12 so that the shafts 44 are stabbed into the nuts 42, which can then be rotated to make up the mating interrupted threads of the nuts 42 and the shafts 44 and secure the bonnet 36 to the hollow body 12.

In some embodiments, including that depicted in FIGS. 4 and 5, each bonnet 36 is also fastened to the hollow body 12 with a bolt 46, which may facilitate installation and removal of rams from the blowout preventer 10 in some instances. When the bonnet 36 is opened as depicted in FIG. 5, for example, a ram 24 can be mounted on a ram button at the end of the actuation rod 30, as generally described above. Some rams (including the rams 24 depicted in FIGS. 2 and 3) have horizontal slots for receiving ram buttons and may be mounted on the ram buttons by laterally moving the rams onto the ram buttons. Although the threaded shafts 44 generally remain attached to the hollow body 12 while the bonnet 36 is open, the bolt 46 may be removed to facilitate installation and removal of a ram 24 through the space vacated by the bolt 46 (i.e., between the upper and lower threaded shafts 44 in the foreground of FIG. 5) while the bonnet 36 remains positioned on the support rods 34.

The threaded shafts 44 and the bolts 46 include ends threaded into the hollow body 12. In at least some instances, these ends are threaded into bushings 48 of the hollow body 12. In other embodiments, however, the ends could be threaded directly into the hollow body 12. The left bonnet 36 in FIG. 3 is depicted without a threaded shaft 44 and a bolt 46 to better show certain features of the nut 42 and the bushings 48, but it will be appreciated that the omitted shaft 44 and bolt 46 could be used for fastening the left bonnet 36 to the hollow body 12 in the same manner as the right bonnet 36.

Figure 6:
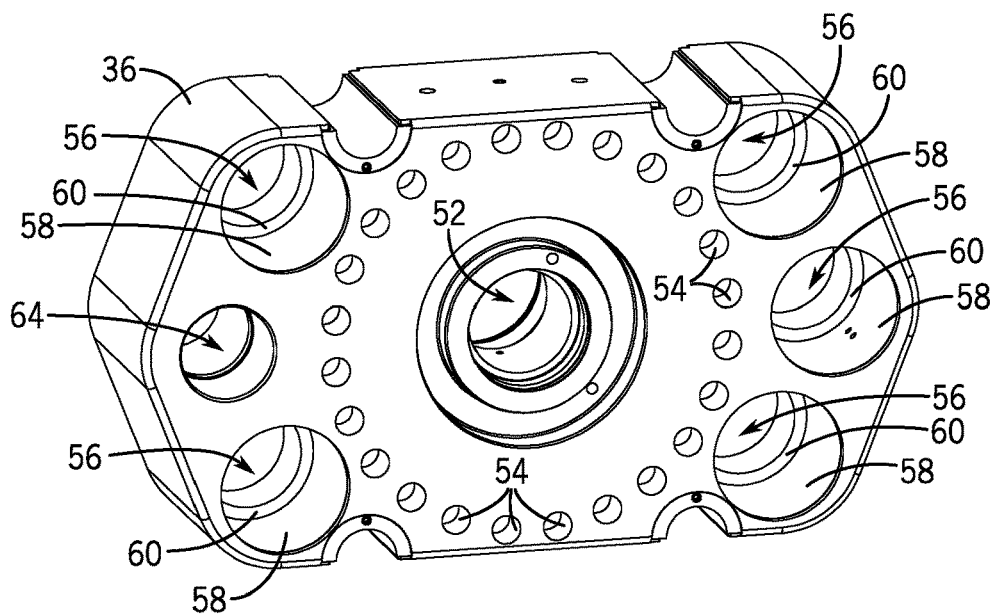
FIG. 6 depicts a bonnet of the blowout preventer of FIG. 1 as having various mounting holes for receiving fasteners in accordance with one embodiment.
Figure 7:
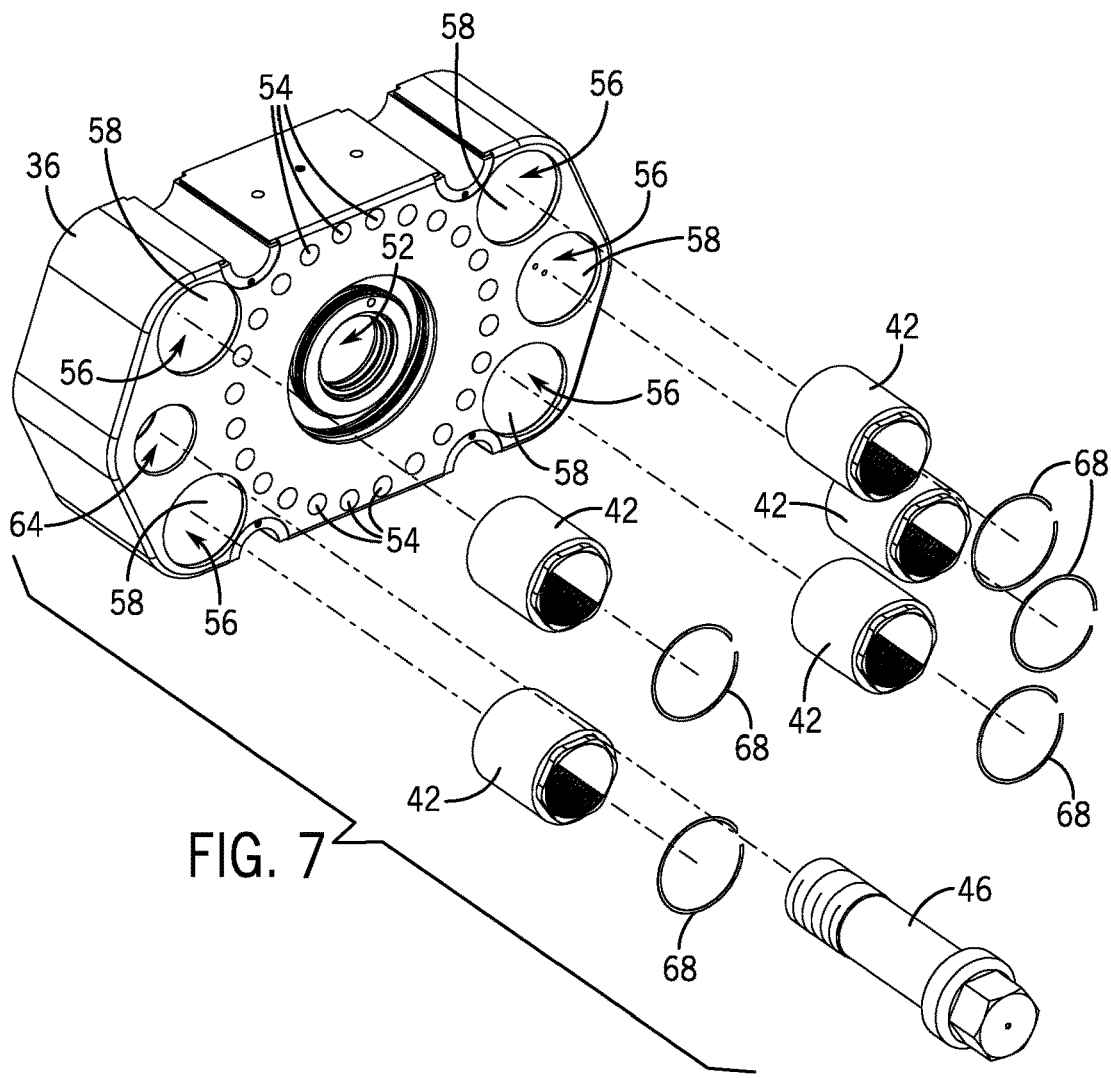
FIG. 7 is an exploded view of the bonnet of FIG. 6 showing nuts having interrupted threads and rings for retaining the nuts in mounting holes of the bonnet in accordance with one embodiment.

Additional features of the bonnets 36 may be better understood with reference to FIGS. 6 and 7. As shown in FIG. 6, the bonnet 36 includes an aperture 52 through which an actuation rod 30 may axially move to position a ram 24 within the ram cavity 26. The depicted bonnet 36 also includes mounting holes 54 for attaching other components of the bonnet assembly 20 (e.g., the operating cylinder including the piston 28), as well as mounting holes 56 that facilitate coupling of the bonnet 36 to the hollow body 12 via the fasteners 42 and 44.

The mounting holes 56 may take various forms, but are shown in FIG. 6 as sockets having counterbores 58 and shoulders 60. The nuts 42 can be positioned within the mounting holes 56. More particularly, in at least some embodiments, the nuts 42 are retained within the mounting holes 56 in a manner that allows rotation of the nuts 42 with respect to the main body of the bonnet 36 to facilitate engagement with the mating threaded shafts 44. That is, rather than having nuts that are individually handled by an operator, the nuts 42 may be held by the bonnet 36 during opening or closing of the bonnet 36. The nuts 42 may be retained in the mounting holes 56 in any suitable manner, such as with retaining rings 68. As depicted in FIG. 7, for instance, the retaining rings 68 are C-rings that can be installed in mating grooves within the mounting holes 56 to retain the installed nuts 42 in the counterbores 58 of the bonnet 36. An additional hole 64 may also be provided in the bonnet 36 for receiving the bolt 46.

Figure 8:
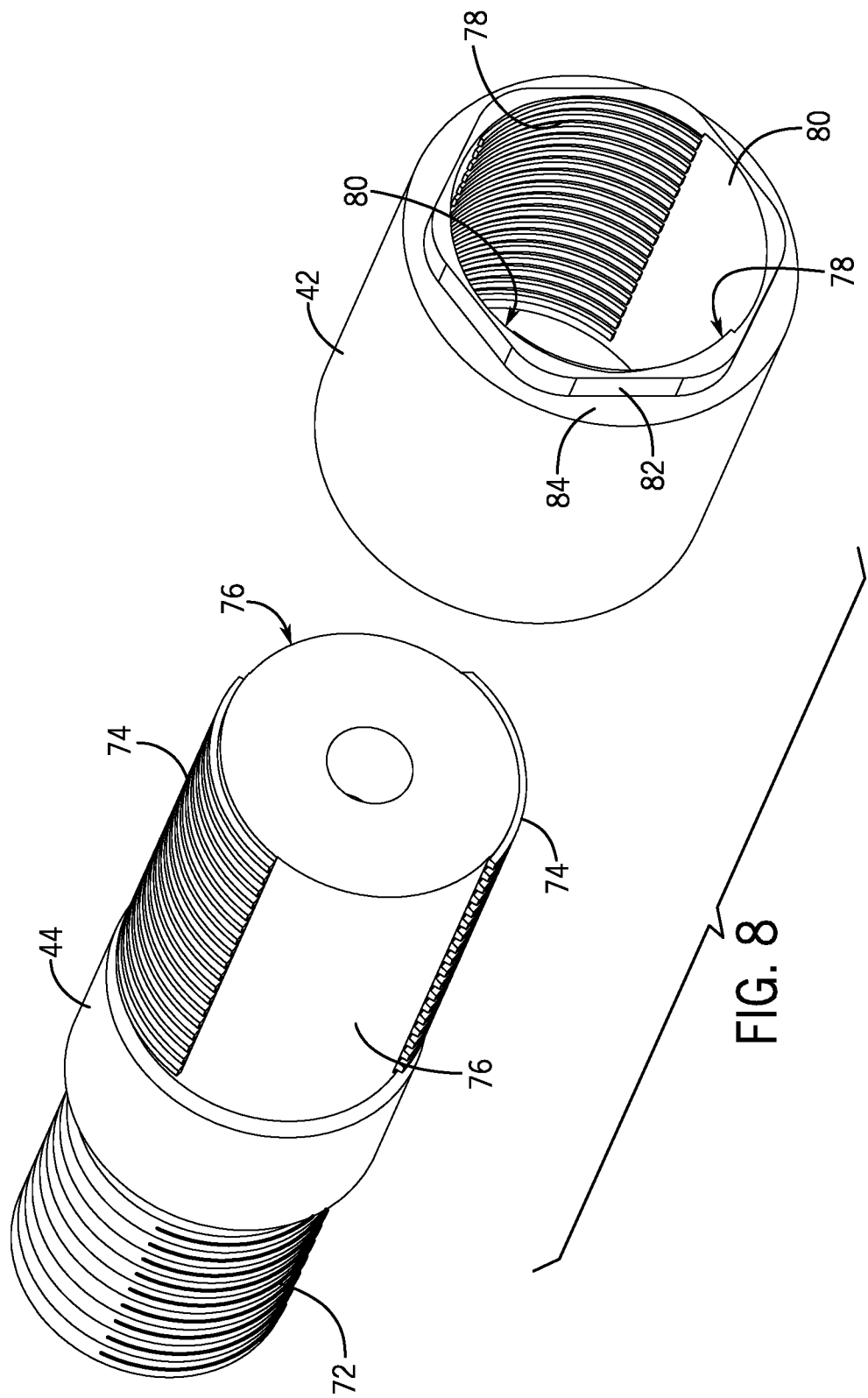
FIG. 8 is a perspective view of a nut and a mating shaft for fastening a bonnet to a blowout preventer, with each of the nut and the shaft having interrupted threads for mating engagement with the other in accordance with one embodiment.
Figure 10:
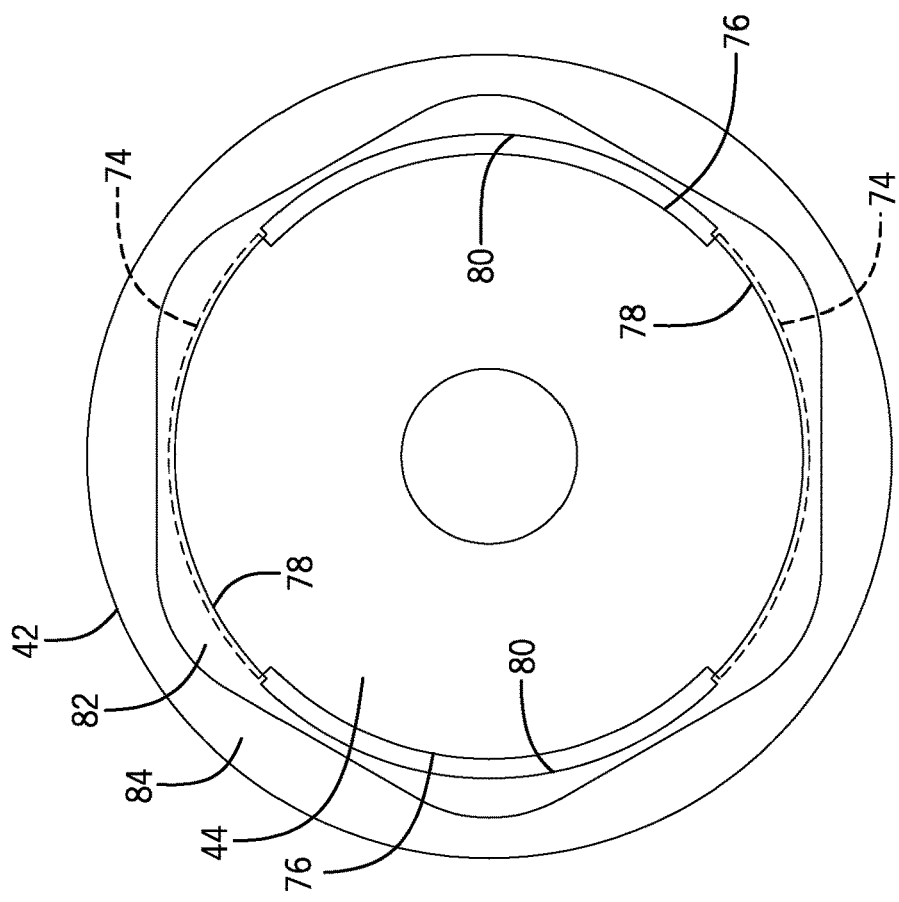
FIG. 10 is also an end view of the nut and mating shaft of FIG. 8, but generally shows the nut rotated with respect to its position in FIG. 9 to make up the threaded connection between the nut and the shaft in accordance with one embodiment.
Figure 9:
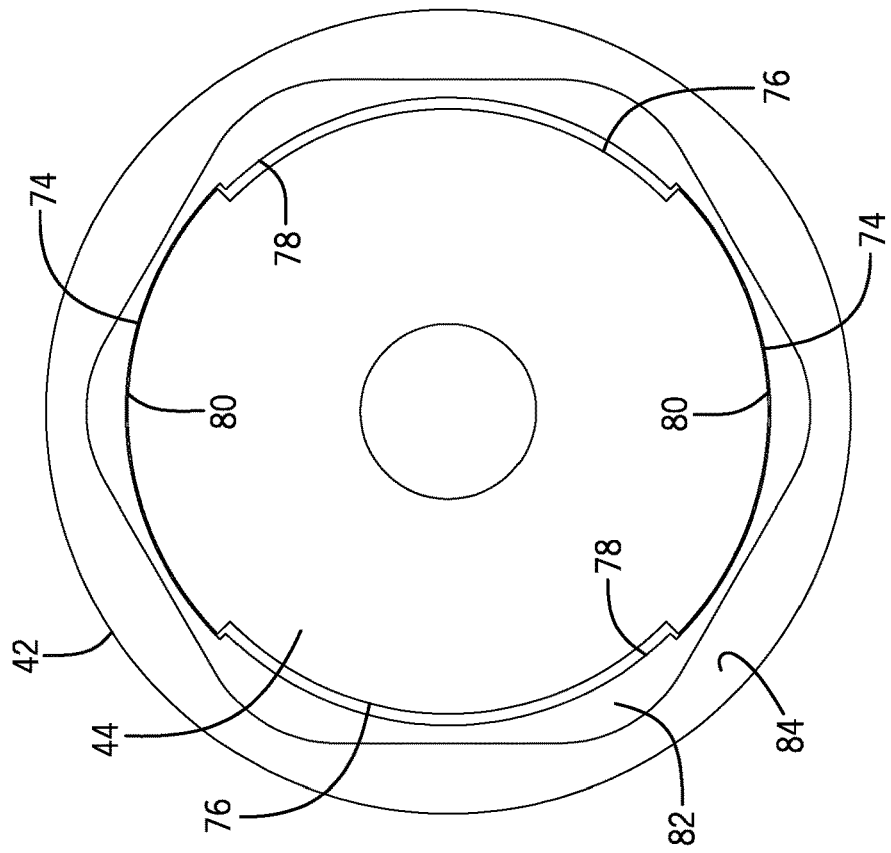
FIG. 9 is an end view of the nut and mating shaft of FIG. 8 and shows the nut rotationally aligned with the shaft to allow the nut to be received axially on the shaft in accordance with one embodiment.

One of the mating pairs of fasteners 42 and 44 is depicted in FIGS. 8-10 by way of example. As generally shown in FIG. 8, the threaded shaft 44 includes a threaded end 72 that facilitates attachment of the shaft 44 to the hollow main body 12 of the blowout preventer 10, such as by threading the end 72 into a bushing 48. The nut 42 and the threaded shaft 44 having mating interrupted thread patterns that include threaded and unthreaded circumferential sections. More specifically, in the example provided in FIG. 8, the shaft 44 includes an exterior having threaded portions 74 and longitudinal unthreaded portions 76, while the nut 42 includes a bore with threaded portions 78 and longitudinal unthreaded portions 80.

In at least some instances, the interrupted thread patterns of the nut 42 and the shaft 44 are formed by machining off portions of circumferential threads to form the longitudinal unthreaded portions 76 and 80 (which may also be referred to as channels) that separate and define the remaining threaded portions 74 and 78. To connect these mating fasteners 42 and 44, the threaded portions of the interrupted thread pattern for each of the fasteners 42 and 44 can be rotationally aligned with the longitudinal unthreaded portions of the other fastener, such as shown in FIG. 8. That is, the nut 42 can be positioned such that its threaded portions 78 are axially aligned with the unthreaded portions 76 of the shaft 44 and such that the unthreaded portions 80 of the nut 42 are axially aligned with the threaded portions 74 of the shaft 44. Once positioned in this manner, the nut 42 can be slipped onto the shaft 44, with the threaded portions 78 of the nut moving axially along the unthreaded portions 76 of the shaft 44, and the threaded portions 74 of the shaft 44 traveling axially along the unthreaded portions 80 of the nut 42. The receipt of the threaded portions 74 and 78 of each fastener 42 and 44 along their mating unthreaded portions 76 and 80 of the other fastener is generally depicted in FIG. 9. After receiving the shaft 44 in its bore, the nut 42 can be rotated with respect to the shaft 44 (e.g., clockwise for right-handed threads, counterclockwise for left-handed threads) to cause the threaded portions 78 of the nut 42 to engage the mating threaded portions 74 of the shaft 44 and make up the threaded connection, as generally shown in FIG. 10. The depicted nuts 42 can include heads 82 to facilitate rotation (e.g., with a tool) and shoulders 84 that cooperate with the retaining rings 68 to retain the nuts 42 within the mounting holes 56 of the bonnet 36.

In at least some embodiments, the nut 42 and shaft 44 have mating interrupted thread patterns that allow the threaded connection between these fasteners to be made up in less than one revolution of the nut 42 with respect to the shaft 44. In the embodiment depicted in FIGS. 8-10, for instance, the threaded connection can be made up with a quarter turn (i.e., a ninety-degree turn). The interrupted thread patterns of the fasteners 42 and 44 can have a coarse pitch (e.g., two threads per inch) to facilitate efficient make up, but any desired thread pitch could be used in other embodiments. Likewise, although generally depicted with a stub acme threadform in FIG. 8, other threadforms could be used in accordance with the present techniques. Still further, in the example shown in FIGS. 8-10 the threaded and unthreaded portions of the interrupted thread patterns are provided about the circumferences of the exterior of the shaft 44 and the bore of the nut 42 in arcs of approximately ninety degrees. (In practice, the arc lengths of the unthreaded portions 76 and 80 may be slightly greater than those of the threaded portions 74 and 78 to accommodate dimensional tolerances and facilitate assembly.) In other embodiments, however, the threaded and unthreaded portions may be provided in angular sections that are not approximately ninety degrees (e.g., threaded and unthreaded portions with circumferential arcs of approximately sixty degrees).

As noted above, bonnets 36 can be connected to the hollow blowout preventer body 12 with various fasteners and, in at least some embodiments, these fasteners include at least one mating pair of fasteners 42 and 44 with interrupted thread patterns. A bonnet 36 can be fastened to the hollow body 12 with any suitable number of fasteners 42 and 44, with or without other fasteners (e.g., bolts 46). The bonnet 36 of FIGS. 6 and 7, for example, includes five retained nuts 42 for pairing with five mating shafts 44 of the hollow blowout preventer body 12. A sectioned end view of such an arrangement, showing the bonnet 36 on the support rods 34 and the nuts 42 tightened on the shafts 44, is provided in FIG. 11.

During installation, each of the nuts 42 may be rotationally aligned with the shafts 44 to allow the shafts 44 to be received within the nuts 42 as the bonnet 36 is closed against the hollow body 12. In certain embodiments, the alignment of the nuts 42 with the shafts 44 could be mechanically facilitated, such as with ball detents within the mounting holes 56, but in other embodiments an operator may align the nuts with the shafts manually without such mechanical assistance. Likewise, the shafts 44 can be held in a desired rotational orientation to facilitate consistent alignment of the shafts 44 and the nuts 42 during installation. In some embodiments, a keyed arrangement may be used to hold the shafts 44 in a desired orientation. For example, the shafts 44 may include keyways for receiving keys after the shafts 44 are attached to the hollow body 12.

Figure 11:
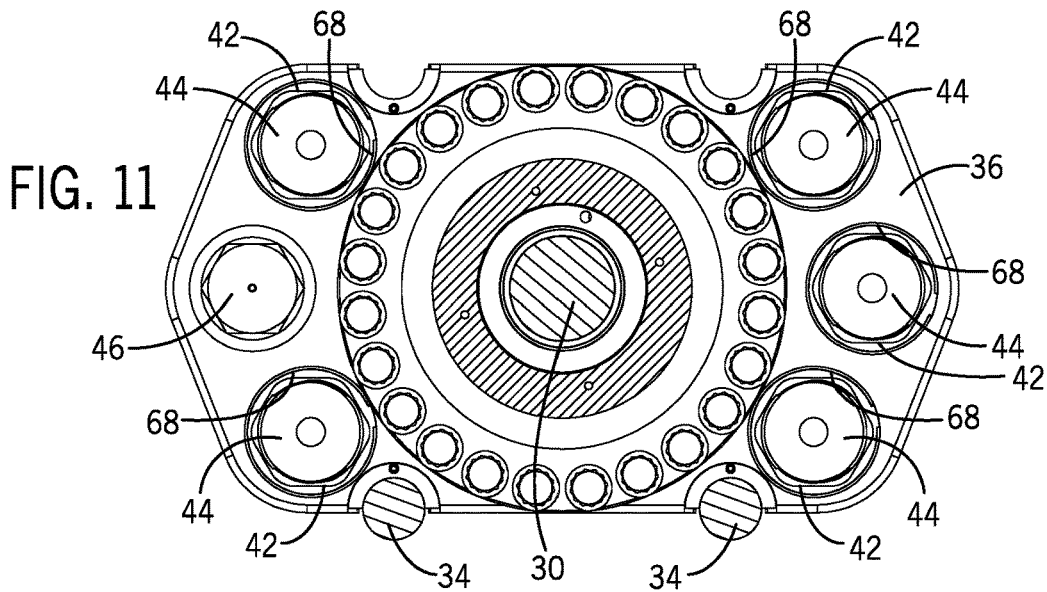
FIG. 11 is an end view of the bonnet, taken along the line 11-11 in FIG. 1, and shows the bonnet with retained nuts mounted on mating shafts and with a bolt in accordance with one embodiment.

With the nuts 42 received on the shafts 44, the bonnet 36 can then be secured to the hollow body 12 by rotating each nut 42 less than one revolution (e.g., ninety degrees clockwise for the fasteners 42 and 44 depicted in FIGS. 8-10). This can meaningfully reduce the time used for fastening or unfastening a bonnet 36 from the hollow body compared to fasteners with traditional circumferential threads, in which an operator may instead rotate each nut through twenty or more revolutions. As depicted in FIG. 11, the retaining rings 68 permit the nuts 42 to be retained within their respective mounting holes 56 of the bonnet 36 during fastening and unfastening of the bonnet 36 from the hollow body 12. In at least some instances, having the nuts 42 retained within the bonnet 36 can reduce or eliminate handling of bulky and heavy nuts individually during opening or closing of the bonnet 36.

Figure 12:
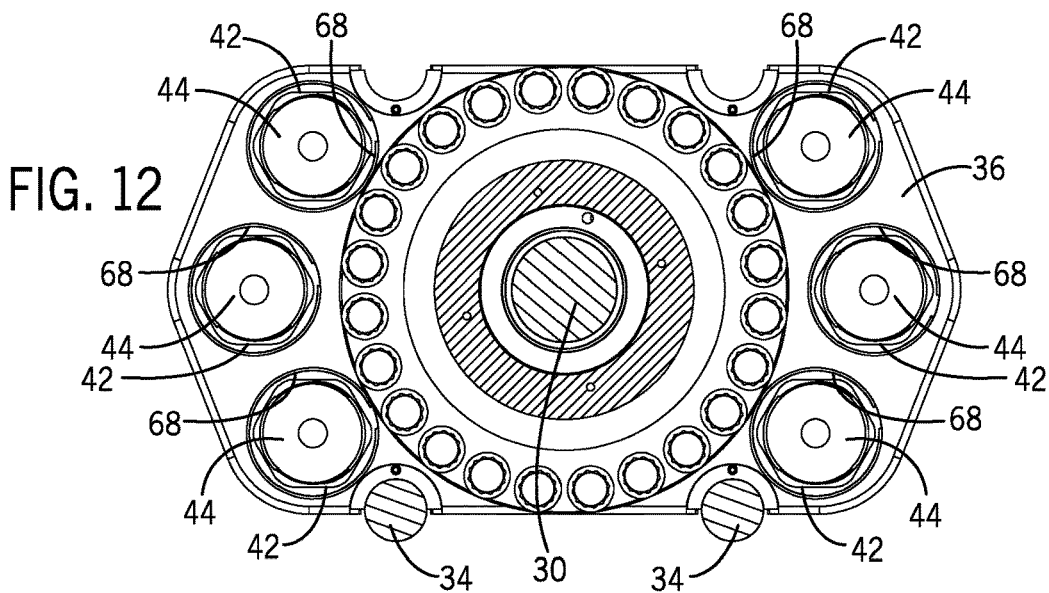
FIG. 12 is an end view of a bonnet similar to that of FIG. 11, but in which an additional nut and shaft are used in place of the bolt in accordance with one embodiment.
Figure 13:
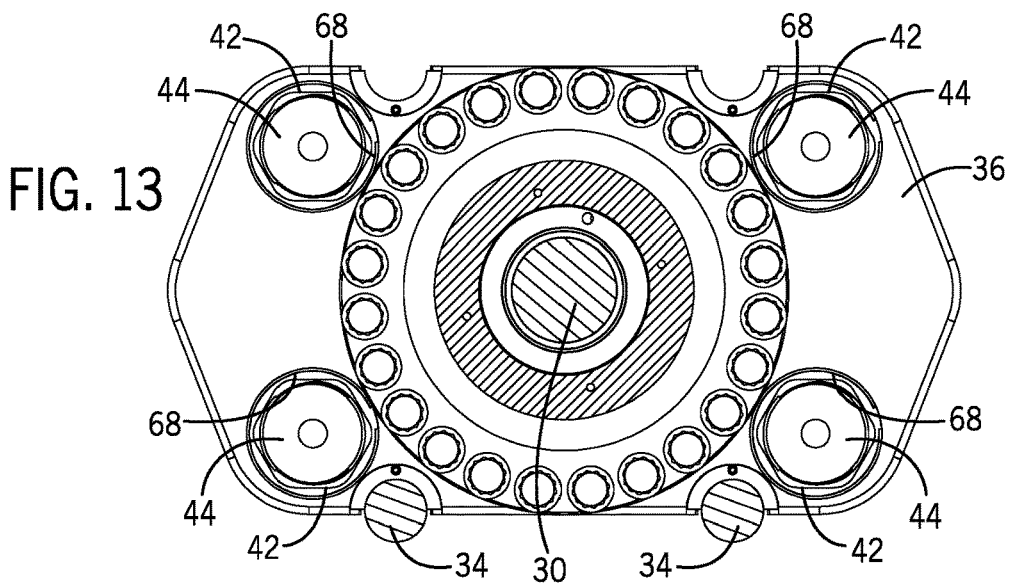
FIG. 13 is an end view of a bonnet with a different fastener arrangement than that depicted in FIG. 11 or 12 in accordance with one embodiment.

One or more bolts 46 may also be used (in addition to the nuts 42 and shafts 44) to fasten the bonnet 36 to the hollow body 12. Although such bolts 46 may facilitate installation and removal of rams in some embodiments, as explained above, in other embodiments the bolts 46 may be omitted and the bonnets 36 may be fastened to the hollow body 12 with only mating pairs of threaded shafts 44 and threaded nuts 42. One example of such an arrangement is depicted in FIG. 12 as having a bonnet 36 with six retained nuts 42 for fastening the bonnet 36 to the hollow body 12 via six mating shafts 44. In some instances, a ram 24 to be used in the blowout preventer 10 could have a vertical slot for receiving a ram button of the connecting rod 30, allowing the ram 24 to be lowered onto the ram button or removed from the ram button through the space between the uppermost shafts 44 when the bonnet 36 is opened but remains positioned on the bonnet support rods 34. In still another example depicted in FIG. 13, the bonnet 36 can be fastened to the hollow body 12 with four pairs of mating nuts 42 and shafts 44. In this instance, a ram 24 could be installed or removed either horizontally or vertically through spaces between shafts 44.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus comprising:
a blowout preventer comprising:
a hollow body;
a ram disposed in a ram cavity of the hollow body;
a bonnet coupled to the hollow body;
an actuation rod coupled to the ram and extending out of the hollow body through the bonnet so as to allow movement of the actuation rod through the bonnet to drive movement of the ram in the ram cavity;
threaded fasteners that fasten the bonnet to the hollow body, wherein the threaded fasteners comprise:
a threaded shaft; and
a threaded nut positioned within an aperture of the bonnet, wherein the threaded shaft and the threaded nut define respective mating interrupted threads with the respective threaded portions and respective longitudinal unthreaded portions such that the respective threaded portions of the threaded shaft are configured to align with respective longitudinal unthreaded portions of the threaded nut and the respective threaded portions of the threaded nut are configured to align with the respective longitudinal unthreaded portions of the threaded shaft to allow the threaded shaft to be received within the threaded nut, and the threaded nut is configured to rotate with respect to the threaded shaft while the threaded shaft is received within the threaded nut to cause the respective threaded portions of the threaded nut to engage the respective threaded portions of the threaded shaft; and
a retaining ring configured to retain the threaded nut within the aperture of the bonnet and to block rotation of the threaded nut with respect to the threaded shaft while the respective threaded portions of the threaded nut engage the respective threaded portions of the threaded shaft.

2. The apparatus of claim 1, wherein the respective mating interrupted threads are configured such that a threaded connection of the threaded shaft with the threaded nut can be made up in less than one revolution of the threaded nut with respect to the threaded shaft.

3. The apparatus of claim 1, wherein the threaded fasteners fastening the bonnet to the hollow body include a bolt extending through the bonnet, wherein the bolt includes a first end having a head on one side of the bonnet and a second end that is opposite the first end and is threaded into the hollow body.

4. The apparatus of claim 1, wherein the bonnet is fastened to the hollow body with only the threaded fasteners.

5. The apparatus of claim 1, wherein the threaded shaft includes a threaded stud.

6. The apparatus of claim 5, wherein the threaded stud extends outwardly from the hollow body.

7. The apparatus of claim 1, wherein the retaining ring and a shoulder within the aperture are configured to retain the threaded nut within the aperture during fastening and unfastening of the bonnet from the hollow body.

8. The apparatus of claim 1, comprising a bonnet assembly including the bonnet, the actuation rod, and a piston coupled to the actuation rod for driving movement of the ram in the ram cavity via the actuation rod.

9. The apparatus of claim 1, wherein the threaded nut defines a first end and a second end, wherein a respective aperture of the threaded nut extends between the first end and the second end, the respective aperture of the threaded nut is configured to receive the threaded shaft to couple the bonnet to the hollow body, the second end comprises a head that extends the respective aperture of the threaded nut, and the head is configured to engage a tool.

10. The apparatus of claim 1, comprising a bonnet support rod coupled to the hollow body, wherein the bonnet defines a groove that is configured to receive the bonnet support rod.

11. The apparatus of claim 1, wherein the bonnet comprises a first surface that is configured to face toward and contact the hollow body while the bonnet is coupled to the hollow body and a second surface that is opposite the first surface and is configured to face away from the hollow body while the bonnet is coupled to the hollow body, and an entirety of the threaded nut is retained between the first surface and the second surface during fastening and unfastening of the bonnet and the hollow body.

12. The apparatus of claim 11, wherein the threaded nut is retained between the first surface and the second surface via a shoulder within the aperture and the retaining ring.

13. The apparatus of claim 1, wherein a respective end surface of the threaded nut is configured to contact a respective end surface of the retaining ring while the respective threaded portions of the threaded nut engage the respective threaded portions of the threaded shaft.

14. An apparatus comprising:
a blowout preventer comprising:
a hollow body;
a bonnet coupled to the hollow body, wherein the bonnet defines a first aperture;
a threaded shaft coupled to the hollow body; and
a nut defining a second aperture, wherein the nut is positioned within the first aperture of the bonnet, the nut defines a first distal end and a second distal end, the second aperture extends between the first distal end and the second distal end, the second aperture is configured to receive the threaded shaft to couple the bonnet to the hollow body, the second distal end comprising a head that extends around the second aperture, and the head is configured to engage a tool; and
a retaining ring configured to retain the nut within the first aperture of the bonnet and to block rotation of the nut with respect to the threaded shaft while respective threaded portions of respective mating interrupted threads of the threaded shaft engage respective threaded portions of respective mating interrupted threads of the nut to couple the bonnet to the hollow body.

15. The apparatus of claim 14, comprising a bolt configured to couple the bonnet to the hollow body, wherein the bolt is configured to extend through a third aperture in the bonnet.

16. The apparatus of claim 14, wherein the blowout preventer is a ram-type blowout preventer.

17. The apparatus of claim 14, comprising a bonnet support rod coupled to the hollow body, wherein the bonnet support rod is configured to support the bonnet, and the bonnet defines a groove that receives the bonnet support rod.

18. The apparatus of claim 14, wherein the respective mating interrupted threads are configured such that a threaded connection of the threaded shaft with the nut can be made up in less than one revolution of the nut with respect to the threaded shaft.

19. A method comprising:
moving a bonnet toward a hollow body of a blowout preventer, wherein moving the bonnet toward the hollow body comprises stabbing a threaded shaft that comprises an interrupted thread and is coupled to the hollow body into a respective aperture of a nut that comprises a mating interrupted thread and is positioned within a respective aperture of the bonnet, wherein the nut defines a first distal end and a second distal end, the respective aperture of the nut extends between the first distal end and the second distal end;
fastening the bonnet to the hollow body, wherein fastening the bonnet to the hollow blowout preventer body comprises engaging a head positioned at the second distal end of the nut and that extends around the respective aperture of the nut with a tool and rotating the tool to drive rotation of the nut relative to the threaded shaft to engage the interrupted thread with the mating interrupted thread to thereby couple the bonnet to the hollow body; and
retaining the nut within the respective aperture of the bonnet and blocking rotation of the nut with respect to the threaded shaft via a retaining ring while the interrupted thread is engaged with the mating interrupted thread.

20. The method of claim 19, wherein rotating the tool to drive the rotation of the nut relative to the threaded shaft to engage the interrupted thread with the mating interrupted thread comprises rotating the nut by less than one revolution to engage the interrupted thread with the mating interrupted thread.

* * * * *